United States Patent Office 2,902,980
Patented Sept. 8, 1959

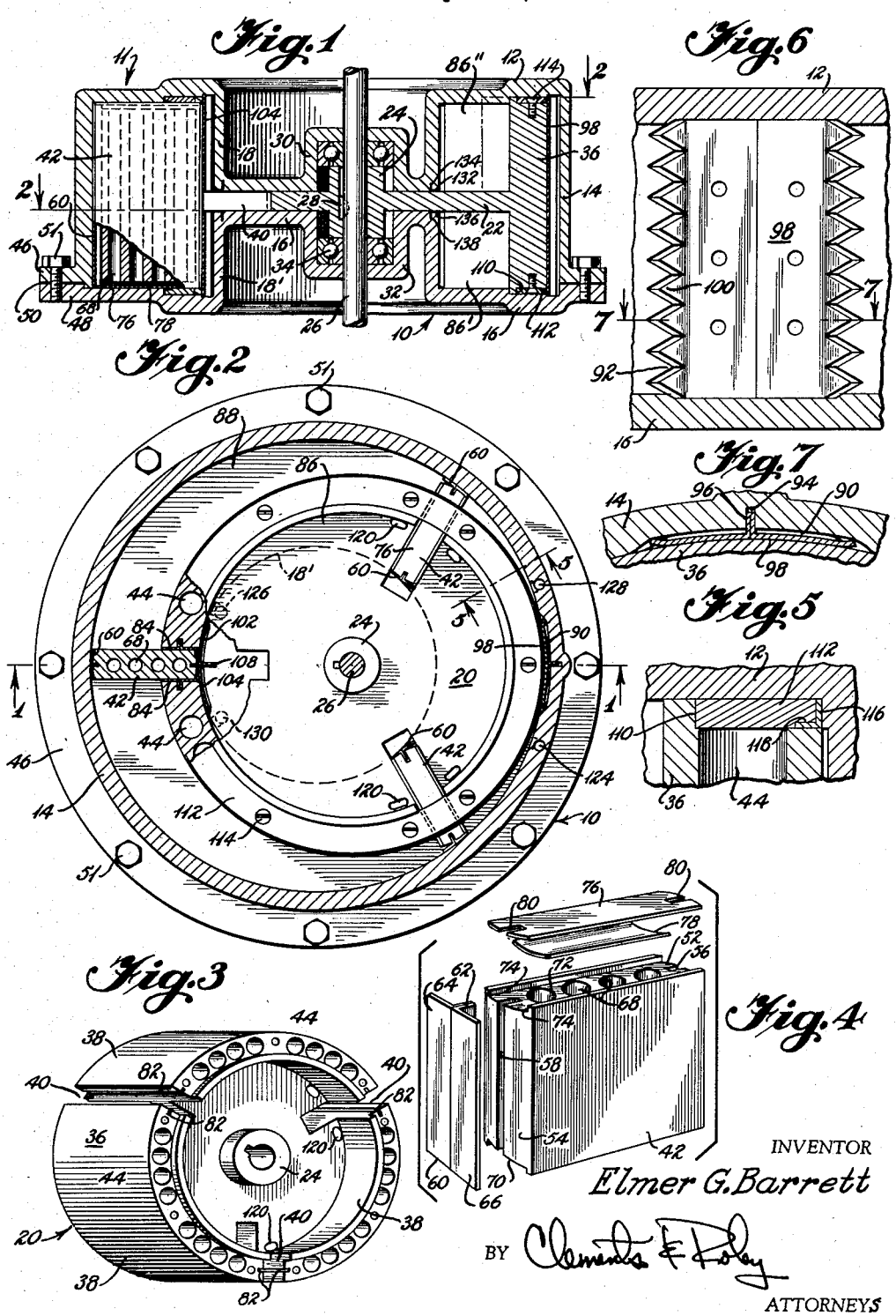

2,902,980

ROTARY MOTOR AND RADIAL SLIDING VANE THEREFOR

Elmer G. Barrett, Pampa, Tex.

Application April 26, 1956, Serial No. 580,890

6 Claims. (Cl. 121—85)

This invention relates to a rotary motor of the multiple expansion type and in particular to improvements in the sealing means for the relatively movable parts thereof, and to other structural improvements in such motors.

In a rotary motor wherein a housing has a chamber formed by an outer flange portion having a radially inwardly facing wall and a hub portion having an outwardly facing wall which is disposed in concentric relation to the flange wall and a rotating piston, comprising a rim carrying a plurality of piston vanes, rotates eccentrically in the housing chamber, with the rim forms an outer expansion chamber with the flange wall and an inner expansion chamber with the hub. In such constructions the flange and hub act as cam surfaces to actuate the piston vanes between the outer expansion chamber and the inner expansion chamber.

Among the difficulties with such constructions is the sealing of the planes and lines of contact between relatively moving parts. It is to overcome some of these deficiencies that the present invention has been developed.

A particular feature of this invention is to provide effective sealing means between the moving parts and the stationary parts of the rotary motor and also between the relatively movable elements thereof.

An additional object of this invention is to prevent leakage of fluid from one of the chambers to the other chamber.

Another object of this invention is to provide effective sealing means between relatively moving parts of the motor to provide a minimum of friction therebetween.

The above and other objects and advantages of this invention will become apparent in the course of the following detailed description taken with the accompanying drawings wherein:

Fig. 1 is a diametrical sectional view taken substantially on the line 1—1 of Fig. 2;

Fig. 2 is a sectional view taken substantially on the line 2—2 of Fig. 1;

Fig. 3 is a perspective view of the piston with the vanes and sealing means removed therefrom;

Fig. 4 is an exploded view of a piston vane;

Fig. 5 is a fragmentary view, taken along line 5—5, Fig. 2, of the seal between the piston and the side walls of the housing;

Fig. 6 is a plan view of a seal in the flange wall between the piston and the housing, and Fig. 7 is a sectional view in detail taken substantially on the line 7—7 of Fig. 6.

Referring now in more particularity to the drawing wherein like elements are represented by the same reference characters in the respective figures thereof, there is shown in Figs. 1 and 2 a rotary motor 10 comprising a housing 11 having a side wall 12, a peripheral flange wall 14, a cover 16, a hub 18, and a piston 20. The piston 20 includes a disc or web 22 having a hub 24 mounted on a shaft 26 by means of a key 28. The shaft 26 is mounted in bosses 30 and 32, in the housing wall 14 and the cover portion 16 respectively, by means of antifriction bearings 34.

The cover portion 16 is provided with a hub portion 18′, hereinafter included with the hub 18 when referring to the inner wall of the housing.

The web 22 has a peripheral rim 36, which in this instance is divided into three segments 38 by means of the three axially extending slots 40 which accommodate the three piston vanes 42, later to be described in more detail. The piston rim 36 is provided with a plurality of openings 44 extending transversely or axially therethrough to reduce the weight thereof. The housing 11 is substantially annularly cup shaped and has a flange 46 at the rim thereof and the cover portion 16 has a flange 48 cooperating with the flange 46 and the gasket 50 to seal the motor against fluid loss. The flanges 46 and 48 are bolted together by bolts 51.

An important feature of this invention is the sealing means between the piston vanes 42 and the other elements of the motor. The vanes 42 are substantially rectangular and have slightly rounded inner and outer ends 52 and 54 respectively engaging the hub 18 and the peripheral wall 14. The ends 52 and 54 are provided with axially extending grooves 56 and 58, respectively, to receive T-shaped springs 60. The springs 60, as shown in Fig. 4, are formed of a single sheet folded on itself to form the stem 62 from which it spreads into the T-arms 64 and 66. As the arms 64 and 66 are flat and substantially in the same plane, they form an effective seal between the ends 52 and 54, respectively, and the hub 18 and the peripheral wall 14.

The vanes 42 are provided with a plurality of axially extending openings 68 to reduce the weight thereof. The sides 70 of the piston vanes 42 are grooves, as at 72, to provide flanges 74. In the grooves 72 are mounted sealing members or plates 76 urged outwardly by leaf springs 78. The plates 76 are slotted at their ends to accommodate the stems of the T-shaped springs 60, to permit relative movement of all of the springs, and sealing means.

The sides of the slots 40 in the piston 20 are provided with axially extending grooves 82 to accommodate T-shaped springs 84 which are substantially identical in construction to the springs 60. The springs 84 engage the sides of the piston vanes 42 to form a seal between the inner chamber 86 and the outer chamber 88. The chamber 86 is divided by the web 22 into two axially spaced compartments 86′ and 86″, generally referred to as chamber 86.

At the point where the piston 20 is always in contact with the peripheral wall 14, I provide an additional seal. A pocket 90 having axially extending serrated leading and trailing edges 92 is formed in the wall 14, and an axially extending groove 94 is formed in the bottom of the pocket 90 to accommodate the stem 96 of a substantially T-shaped spring 98, formed substantially as described for the T-shaped springs 60. The sides of the spring 98 have serrations 100 registering and meshing with the serrations 92. The spring 98, being substantially planar, forms an effective seal between the housing 14 and the piston.

At the point where the piston is always in contact with the hub 18 a pocket 102 is formed in the hub, and a T-shaped spring 104 has the stem thereof inserted in an axially extending groove 108 in the hub. The spring 104 forms an effective seal between the piston 20 and the hub 18. The pocket 102 and spring 104 are similar in construction to the pocket 90 and spring 98, heretofore described.

The axial outer faces of the piston 20 are grooved or rabbeted, as at 110, to accommodate a series of plates 112 fastened to the piston 20 by means of screws 114, which plates reenforce the rotating piston rim 36 and also cover the openings 44 therein. Between the plates 112 and the piston vanes 42 is an angle or L-shaped seal 116 which rests in an angle or L-shaped rabbet 118 in the plate 112, one side bearing against the piston vanes 42 and the other side bearing against the wall 14.

A plurality of ports 120 are provided in the web 22 to equalize the pressure in the two portions of the chamber 86. Intake ports 124 and 126 provide for the admission of fluid to the chambers 88 and 86 respectively, and exhaust ports 128 and 130 are respectively provided for the same chambers. The ports are shown with no fluid connections, as such ports and connections are well known and are substantially as in my prior patent No. 2,699,151, issued January 11, 1955.

To seal the web 22 of the piston 20 against the housing I provide an L-shaped spring ring 132 in a shallow rabbet in the housing member 12 with the angled end in a groove 134 in the housing. A similar spring ring 136 is provided in a suitable rabbet in the cover 16 with the angled end in a groove 138 in the cover 16.

The spring members 60, 78, 84, 98, 104, 132 and 136 are preferably formed of thin spring steel, though other metals may be used. These members are of the order of .005 inch to .01 inch in thickness and exert a light and yielding sealing pressure against the surfaces on which they operate, to effectively prevent undesirable fluid loss or transfer of fluid between the chambers.

While I have shown only the preferred form of my invention, I desire it to be understood that various changes or modifications may be made within the scope of the claims hereto attached without departing from the objects of the invention.

I claim:

1. A sealing means for effectively establishing a seal between a rotating piston vane and a housing of a rotary motor, said sealing means comprising a unitary spring element of substantially T-shape in cross-section, the stem of said element being insertable into a groove in a piston vane with the T-arms engaging a housing of a rotary motor.

2. A sealing means for effectively establishing a seal between a rotating element and a stationary element, said sealing means being carried by said rotating element and comprising a unitary spring element of substantially T-shape in cross-section, the stem of said element being insertable into a groove in the rotating element with the T-arms in sealing control with the stationary element.

3. A sealing means for effectively establishing a seal between two relatively movable members, said sealing means comprising a spring element of substantially T-shape in cross-section, the stem of said element being insertable into a groove in one of the members with the T-arms in sealing contact with the other member.

4. The structure as set forth in claim 3 wherein the groove in said one member has serrated margins and the T-arms of said sealing means has serrations which register with the serrations of said groove.

5. A rotating piston comprising a hub portion, a web portion radiating from the hub portion, a peripheral rim portion extending transversely of the web portion, transverse radial slots in said web portion and said rim portion and vanes in said slots; the improvement which comprises an annular series of axially aligned openings in said peripheral rim, a groove in the annular face of said rim portion and an annular member located in said groove and covering said openings and reenforcing said rim portion.

6. The device according to claim 5, wherein the annular cover is provided at its outer periphery with an annular L-shaped groove, and an L-shaped annular seal is provided in said L-shaped groove.

References Cited in the file of this patent

UNITED STATES PATENTS

| 448,213 | Elgen | Mar. 17, 1891 |
| 519,156 | Knauss et al. | May 1, 1894 |
| 677,752 | Bellas | July 2, 1901 |
| 940,246 | Hagerty | Nov. 16, 1909 |
| 2,463,155 | Dawes | Mar. 1, 1949 |

FOREIGN PATENTS

| 31,077 | Switzerland | Feb. 25, 1904 |
| 282,263 | Great Britain | Dec. 22, 1927 |